United States Patent [19]

Clark et al.

[11] Patent Number: 5,049,366

[45] Date of Patent: Sep. 17, 1991

[54] CRYSTALLINE ALUMINOPHOSPHATES COMPOSITIONS

[75] Inventors: David M. Clark; Ronald J. Dogterom, both of Amsterdam, Netherlands

[73] Assignee: Shell Oil Company, Houston, Tex.

[21] Appl. No.: 468,307

[22] Filed: Jan. 22, 1990

[30] Foreign Application Priority Data

Jan. 31, 1989 [GB] United Kingdom ............ 8902083.8

[51] Int. Cl.$^5$ ...................... C01B 35/12; C01B 25/36; B01J 27/18; B01J 27/182
[52] U.S. Cl. .................................... 423/277; 423/305; 423/306; 502/208; 502/213; 502/214; 208/46
[58] Field of Search ............... 423/305, 306, 277, 279, 423/326, 328, 329; 502/214, 208, 213; 208/46

[56] References Cited

U.S. PATENT DOCUMENTS

| | | | |
|---|---|---|---|
| 4,310,440 | 1/1982 | Wilson et al. | 423/305 |
| 4,440,871 | 4/1984 | Lok et al. | 502/214 |
| 4,647,442 | 3/1987 | Derouane et al. | 423/306 |
| 4,744,970 | 5/1988 | Lok et al. | 423/306 |
| 4,943,424 | 7/1990 | Miller | 423/328 |

Primary Examiner—R. Bruce Breneman

[57] ABSTRACT

Crystalline aluminophosphates and related compounds having in the as-synthesized anhydrous form the chemical composition:

$m'R(X_nAl_qP_x)O_2$, wherein R represents ethylenediamine, X represents one or more elements which can be substituted for Al and/or P, wherein $m' = 0.01-0.33$
$n = 0-0.50$
$q = 0.30-0.60$
$x = 0.30-0.60$ and wherein $n+q+x = 1$.

The compounds can be prepared from a forming solution or gel comprising a source of aluminum, a source of phosphorus, ethylenediamine and optionally a source of at least one component X, which mixture is kept at elevated temperature for a period of time sufficient to produce a crystalline aluminophosphate or related compound followed by separating off the crystalline product obtained and drying, and which may subsequently be calcined.

14 Claims, No Drawings

CRYSTALLINE ALUMINOPHOSPHATES COMPOSITIONS

FIELD OF THE INVENTION

The present invention relates to novel crystalline aluminophosphate compositions and a process for preparing such aluminophosphate compositions.

BACKGROUND OF THE INVENTION

Crystalline aluminophosphate compositions are well known materials which find a promising reception in industry as new generations of molecular sieves, catalyst carriers as well as catalysts. For instance, in U.S. Pat. No. 4,310,440, the preparation of various crystalline aluminophosphates is described from reaction mixtures containing a variety of organic templating agents including tetrapropylammonium hydroxide, quinuclidine, t-butylamine and ethylenediamine.

Classes of these materials comprise compositions crystallized in the $AlPO_4$, $SAPO_4$ (siliconaluminophosphate), $MeAPO_4$ (metalloaluminophosphate) and $ElAPO_4$ (non-metal substituted aluminophosphate) families.

It has now been found that novel crystalline aluminophosphates and related compounds, e.g. of the $AlPO_4$-, $SAPO_4$- and $MeAPO_4$-type can be prepared from reaction gels or solutions when use is made of specific molar ratios of the forming components utilizing a certain organic diamine compound.

SUMMARY OF THE INVENTION

The present invention thus relates to crystalline aluminophosphates and related compounds having in the as-synthesized anhydrous form the chemical composition:

m'$R(X_nAl_qP_x)O_2$, wherein R represents ethylenediamine, X represents one or more elements which can be substituted for Al and/or P, wherein m' = 0.01–0.33
n = 0–0.50
q = 0.30–0.60
x = 0.30–0.60 and wherein n+q+x=1,
and having an X-ray diffraction pattern containing at least the following lines:

| d(A) | Intensity |
|---|---|
| 9.30 ± 0.2 | vs |
| 5.40 ± 0.1 | m |
| 5.30 ± 0.1 | m |
| 4.25 ± 0.05 | w |
| 4.07 ± 0.05 | w |
| 3.50 ± 0.05 | w |
| 3.30 ± 0.05 | m |
| 3.10 ± 0.05 | w |
| 2.96 ± 0.05 | w |
| 2.84 ± 0.05 | w |

DESCRIPTION OF THE PREFERRED EMBODIMENTS

The present invention particularly relates to aluminophosphates and related compounds having the chemical composition as described hereinabove, wherein m' = 0.15–0.30
n = 0–0.30
q = 0.44–0.60 and
x = 0.44–0.60.

As element X which can be substituted for aluminum and/or phosphorus in the crystalline aluminophosphates and related compounds according to the present invention can suitably be used one or more of beryllium, magnesium, titanium, manganese, iron, cobalt, zinc, vanadium, nickel, chromium, silicon, lithium, boron, gallium, germanium and arsenic. Typically, said element will be one or more of magnesium, titanium, manganese, iron, cobalt, zinc, nickel, silicon, gallium or germanium, and preferably one or more of magnesium, titanium, manganese, iron, cobalt and silicon.

An example of a novel crystalline aluminophosphate according to the present invention and belonging to the $AlPO_4$ class has in the as-synthesized anhydrous form the following chemical composition:

0.12 R $(Al_{0.5}P_{0.5})O_2$ having an X-ray diffraction pattern as given in Table I.

A further example, belonging to the $SAPO_4$ class has in the as-synthesized anhydrous form the following chemical composition:

0.13 R $(Si_{0.1}Al_{0.49}P_{0.41})O_2$ having an X-ray diffraction pattern as given in Table II.

An example of a crystalline aluminophosphate belonging to the $MeAPO_4$ class has in the as-synthesized anhydrous form the chemical composition:

0.125 R $(Co_{0.05}Al_{0.45}P_{0.50})O_2$ having an X-ray diffraction pattern as given in Table III.

The present invention also relates to a process for preparing novel crystalline aluminophosphates as well as related compounds as defined hereinbefore from a forming solution or gel comprising a source of aluminum, a source of phosphorus, ethylenediamine and optionally a source of at least one component X, which mixture is kept at elevated temperature for a period of time sufficient to produce a crystalline aluminophosphate or related compound followed by separating off the crystalline product obtained and drying, in which solution or gel the various components are initially present in the following molar ratios:

R:$Al_2O_3$ = 0.65–3
X:$Al_2O_3$ = 0–2
P:$Al_2O_3$ = 0.3–1.3
$H_2O$:$Al_2O_3$ = 30–500, wherein X and R have the meanings as defined hereinbefore.

The crystalline aluminophosphates and related compounds according to the present invention are preferably prepared from a forming solution or gel in which the various components are initially present in the following molar ratios:

R:$Al_2O_3$ = 0.8–2
X:$Al_2O_3$ = 0–2
P:$Al_2O_3$ = 0.4–1.25
$H_2O$:$Al_2O_3$ = 35–320.

Crystalline aluminophosphates and related compounds according to the present invention are normally prepared from an aqueous forming solution or gel at a temperature between 80° C. and 185° C., in particular between 100° C. and 160° C.

The process according to the present invention can be carried out at autogenous pressure as well as at an elevated pressure. Normally, the novel crystalline aluminophosphates and related compounds will be produced when the forming solution or gel has been kept under the appropriate conditions for a period of time allowing the proper structure to be formed.

Preferably, the process according to the present invention is carried out for a period of time ranging between 18 hours and 144 hours.

Examples of suitable aluminum sources comprise boehmite, pseudo-boehmite and aluminum alkoxides, preferably aluminum isopropoxide.

Suitable phosphorus sources comprise phosphorus acids, phosphorus oxides, phosphates and phosphites, preferably ortho-phosphoric acid.

Examples of suitable sources of X comprise the appropriate chlorides, iodides, bromides, nitrates, sulfates and acetates, preferably acetates, as well as oxides.

If desired, the crystalline aluminophosphates or related compounds produced can be calcined after drying to produce the desired calcined substantially R-free aluminophosphates or related compounds.

It has been found that agitation can advantageously be applied to produce the desired crystalline aluminophosphates or related compounds from the forming solution or gel.

The novel crystalline aluminophosphates and related compounds according to the present invention can suitably be used as molecular sieves, catalysts or as catalyst carriers in the operation of various catalytic processes. If desired, one or more (catalytically) active species, in particular protons and/or precursors thereof and/or one or more metal(s) (compounds) of Group III and/or the transition metals and/or rare earth metals and/or precursors thereof, can be incorporated into the crystalline aluminophosphates and related compounds according to the present invention.

They can be incorporated by well-known techniques such as, for example, impregnation and ion-exchange.

The invention will now be illustrated by the following Examples.

Example I

A crystalline $AlPO_4$ was prepared by mixing 27.2 grams of aluminum isopropoxide, 15.4 grams of 85% $H_3PO_4$, 4 grams of ethylenediamine and 48.1 grams of water to form a mixture having a pH between 7.1 and 8.3. This mixture was consequently maintained at 120° C. for 72 hours until a crystalline compound was obtained.

After synthesis the crystalline compound produced was separated from the reaction mixture by filtration, water washed, and dried at 120° C.

The crystalline compound obtained had in the anhydrous form the following chemical composition:

0.12 R $(Al_{0.5}P_{0.5})O_2$ (R = ethylenediamine) and an X-ray diffraction pattern containing at least the lines as given in Table I below.

TABLE I

| d(A) | Intensity |
| --- | --- |
| 9.32 | vs |
| 5.47 | m |
| 5.25 | m |
| 4.29 | w |
| 4.24 | w |
| 4.09 | w |
| 3.52 | w |
| 3.31 | m |
| 3.09 | w |
| 2.97 | w |
| 2.92 | w |
| 2.85 | w |

Example II

A crystalline $SAPO_4$ was prepared in an experiment which was carried out in a substantially analogous manner as described in Example I, except that the reaction mixture contained 51.7 grams of water and additionally 10.4 grams of silicasol (Ludox AS; 38.5% $SiO_2$, 61.5% water), and was carried out at 160° C. for 72 hours.

The crystalline SAPO obtained had in the anhydrous form the following chemical composition:

0.13 R $(Si_{0.1}Al_{0.49}P_{0.41})O_2$ (R = ethylenediamine) and an X-ray diffraction pattern containing at least the lines as given in Table II below.

TABLE II

| d(A) | Intensity |
| --- | --- |
| 9.34 | vs |
| 5.44 | m |
| 5.33 | m |
| 4.28 | w |
| 4.24 | w |
| 4.07 | w |
| 3.51 | w |
| 3.31 | m |
| 3.10 | w |
| 2.96 | w |
| 2.92 | w |
| 2.85 | w |

Example III

A crystalline $CoAPO_4$ was prepared in an experiment which was carried out in a substantially analogous manner as described in Example I, except that the reaction mixture contained 15.5 grams of 85% $H_3PO_4$, 47.6 grams of water and additionally 2.09 grams of $Co(CH_3COO)_2 \cdot 4H_2O$, and was carried out at 160° C. for 96 hours.

The crystalline CoAPO obtained had in the anhydrous form the following chemical composition:

0.125 R $(Co_{0.05}Al_{0.45}P_{0.50})O_2$ (R = ethylenediamine) and an X-ray diffraction pattern containing at least the lines as given in Table III below.

TABLE III

| d(A) | Intensity |
| --- | --- |
| 9.33 | vs |
| 5.40 | m |
| 5.27 | m |
| 4.29 | w |
| 4.23 | w |
| 4.07 | w |
| 3.49 | w |
| 3.30 | m |
| 3.09 | w |
| 2.96 | w |
| 2.90 | w |
| 2.85 | w |

What is claimed is:

1. Crystalline aluminophosphates having in the as-synthesized anhydrous form the chemical composition: m'R$(X_nAl_qP_x)O_2$, wherein R represents ethylenediamine, X represents one or more elements which can be substituted for Al and/or P and is selected from the group consisting of beryllium, magnesium, titanium, manganese, iron, cobalt, zinc, vanadium, nickel, chromium, silicon, lithium, boron, gallium, germanium and arsenic, wherein m' = 0.01–0.33
n = 0–0.50
q = 0.30–0.60 x = 0.30–0.60 and wherein n+q+x=1, and having an X-ray diffraction pattern containing at least the following lines:

| d(A) | Intensity |
| --- | --- |
| 9.30 ± 0.2 | vs |
| 5.40 ± 0.1 | m |
| 5.30 ± 0.1 | m |
| 4.25 ± 0.05 | w |
| 4.07 ± 0.05 | w |
| 3.50 ± 0.05 | w |
| 3.30 ± 0.05 | m |
| 3.10 ± 0.05 | w |
| 2.96 ± 0.05 | w |
| 2.84 ± 0.05 | w |

2. The crystalline aluminophosphates of claim 1 wherein:

m' = 0.15–0.30
n = 0–0.30
q = 0.44–0.60 and
x = 0.44–0.60

3. The crystalline aluminophosphates of claim 1 wherein X represents at least one element selected from the group consisting of magnesium, manganese, titanium, iron, cobalt and silicon.

4. The crystalline aluminophosphates of claim 1 wherein one or more active species have been incorporated by impregnation or ion exchange into said crystalline aluminophosphates.

5. The crystalline aluminophosphates of claim 4 wherein said catalytically active species is selected from the group consisting of protons, precursors of protons, transition metals, rare earth metals, precursors of rare earth metals, or combinations thereof.

6. A process for preparing crystalline aluminophosphates having an X-ray diffraction pattern containing at least the following lines:

| d (A) | Intensity |
| --- | --- |
| 9.30 ± 0.2 | vs |
| 5.40 ± 0.1 | m |
| 5.30 ± 0.1 | m |
| 4.25 ± 0.05 | w |
| 4.07 ± 0.05 | w |
| 3.50 ± 0.05 | w |
| 3.30 ± 0.05 | m |
| 3.10 ± 0.05 | w |
| 2.96 ± 0.05 | w |
| 2.84 ± 0.05 | w | from a forming solution or gel comprising a source of aluminum, a source of phosphorus, ethylenediamine and optionally a source of at least one component X which can be substituted for aluminum and/or phosphorus and is selected from the group consisting of beryllium, magnesium, titanium, manganese, iron, cobalt, zinc, vanadium, nickel, chromium, silicon, lithium, boron, gallium, germanium, and arsenic, which solution or gel is kept at a temperature between 80° C. and 185° C. for a period of time sufficient to produce said crystalline aluminophosphates followed by separating off the crystalline product obtained and drying, wherein the various components of said solution or gel or initially present in the following molar ratios:

$R:Al_2O_3 = 0.65-3$
$X:Al_2O_3 = 0-2$
$P:Al_2O_3 = 0.3-1.3$
$H_2O:Al_2O_3 = 30-500$.

7. The process of claim 6 wherein the various components in the forming solution or gel are initially present in the following molar ratios:

$R:Al_2O_3 = 0.8-2$
$X:Al_2O_3 = 0-2$
$P:Al_2O_3 = 0.4-1.25$
$H_2O:Al_2O_3 = 35-320$.

8. The process of claim 6 wherein the forming solution or gel is kept for a period of time ranging between 18 and 144 hours under crystal-forming conditions.

9. The process of claim 6 wherein said source of aluminum is selected from the group consisting of boehmite, pseudo-boehmite and aluminum alkoxides.

10. The process of claim 9 wherein aluminum isopropoxide is the source of aluminum.

11. The process of claim 6 wherein said source of phosphorus is selected from the group consisting of phosphorus acids, phosphorus oxides, phosphates and phosphites.

12. The process of claim 11 wherein phosphoric acid is the source of phosphorus.

13. The process of claim 6 wherein the source of component X is a salt selected from the group consisting of chlorides, iodides, bromides, sulfates, nitrates, acetates oxides and mixtures thereof.

14. The process of claim 13 wherein the source of component X is in the form of an acetate.

* * * * *